US012643267B2

(12) United States Patent
Horikawa et al.

(10) Patent No.: US 12,643,267 B2
(45) Date of Patent: Jun. 2, 2026

(54) METHOD FOR PRODUCING COMPOSITE MATERIAL

(71) Applicant: TEIJIN LIMITED, Osaka (JP)

(72) Inventors: Miki Horikawa, Osaka (JP); Takaya Suzuki, Osaka (JP)

(73) Assignee: TEIJIN LIMITED, Osaka (JP)

(*) Notice: Subject to any disclaimer, the term of this patent is extended or adjusted under 35 U.S.C. 154(b) by 0 days.

(21) Appl. No.: 17/241,640

(22) Filed: Apr. 27, 2021

(65) Prior Publication Data

US 2021/0347096 A1 Nov. 11, 2021

(30) Foreign Application Priority Data

Apr. 30, 2020 (JP) ................................ 2020-080872

(51) Int. Cl.

*B29C 70/00* (2006.01)
*B29C 35/02* (2006.01)
*B29C 70/02* (2006.01)
*B29K 63/00* (2006.01)
*B29K 79/00* (2006.01)
*B29K 307/04* (2006.01)

(52) U.S. Cl.

CPC ........ *B29C 35/0294* (2013.01); *B29C 70/003* (2021.05); *B29C 70/025* (2013.01); *B29K 2063/00* (2013.01); *B29K 2079/08* (2013.01); *B29K 2307/04* (2013.01)

(58) Field of Classification Search

CPC .. B05D 3/0209; B29C 70/002; B29K 2277/10
See application file for complete search history.

(56) References Cited

U.S. PATENT DOCUMENTS

| | | | | |
|---|---|---|---|---|
| 3,987,230 A * | 10/1976 | Gaku | H05K 1/036 | 428/432 |
| 5,002,821 A * | 3/1991 | Browne | C08L 63/00 | 442/248 |
| 5,077,363 A | 12/1991 | Eisenbarth et al. | | |
| 5,637,387 A * | 6/1997 | Chin | C08G 73/12 | 524/378 |
| 5,662,761 A * | 9/1997 | Middelman | B32B 37/226 | 428/209 |
| 5,672,311 A * | 9/1997 | May | C08J 3/244 | 264/347 |
| 5,783,272 A * | 7/1998 | Wong | B29C 70/025 | 428/36.1 |
| 2003/0079369 A1* | 5/2003 | Luski | H05K 3/227 | 34/445 |
| 2004/0043144 A1* | 3/2004 | Carter | B29C 70/545 | 427/180 |
| 2004/0170554 A1* | 9/2004 | Wadahara | B29C 70/226 | 423/447.2 |
| 2005/0255766 A1* | 11/2005 | Kruger | B29C 70/224 | 156/60 |
| 2006/0258241 A1* | 11/2006 | Roseen | H05K 1/0366 | 442/64 |
| 2007/0151657 A1* | 7/2007 | Garate Fel | B29C 66/1122 | 156/212 |
| 2007/0292703 A1* | 12/2007 | Ikuta | C08J 5/12 | 524/502 |
| 2009/0148637 A1* | 6/2009 | Zhang | B32B 9/00 | 977/773 |
| 2009/0208721 A1* | 8/2009 | Tsuchiya | B29C 66/7394 | 264/250 |
| 2010/0092770 A1* | 4/2010 | Wadahara | B29C 70/025 | 156/278 |
| 2014/0138872 A1* | 5/2014 | Hattori | B29C 70/48 | 264/250 |
| 2014/0273694 A1 | 9/2014 | Li et al. | | |
| 2015/0367559 A1* | 12/2015 | Hattori | B29C 66/524 | 264/40.6 |
| 2017/0037185 A1* | 2/2017 | Briffaud | B29C 45/0005 | |
| 2021/0122892 A1* | 4/2021 | Kobayashi | C08G 59/3227 | |
| 2021/0221969 A1* | 7/2021 | Oota | C08L 63/00 | |

FOREIGN PATENT DOCUMENTS

| | | |
|---|---|---|
| JP | 2014-114369 A | 6/2014 |
| JP | 2016-510833 A | 4/2016 |
| JP | 2019-157097 A | 9/2019 |

OTHER PUBLICATIONS

Notice of Reasons for Refusal issued on Aug. 1, 2023 in Japanese Patent Application No. 2020-080872.

* cited by examiner

*Primary Examiner* — Andrew D Graham
(74) *Attorney, Agent, or Firm* — Sughrue Mion, PLLC

(57) ABSTRACT

A prepreg consisting of a fiber reinforcement material and a resin composition containing a bismaleimide resin is molded through a first heating step in which the prepreg is held at a temperature ($T_1$) equal to or higher than a temperature at which the resin composition exhibits a viscosity of 100 (Pa·s) and equal to or lower than a temperature at which the resin composition exhibits the minimum viscosity for 30 minutes or more, followed by being held at a temperature equal to or higher than a curing temperature of the bismaleimide resin.

5 Claims, No Drawings

METHOD FOR PRODUCING COMPOSITE MATERIAL

BACKGROUND

Technical Field

The present invention relates to a method for producing a composite material. More specifically, it relates to a method for producing a composite material including a step of curing, by multistage heating, a prepreg consisting of a fiber reinforcement material and a resin composition containing a bismaleimide resin.

Related Art

A fiber reinforced composite material excellent in specific strength and specific elastic modulus is widely used in aerospace components and the like. As a method for producing the fiber reinforced composite material, a method for producing a compos it e material including a step of curing a prepreg, which is integrally constituted of a fiber reinforcement material and a thermosetting resin in an uncured state in advance, is widely used.

Examples of the method tor producing a composite material include an autoclave molding method. JP2019-157097 A discloses that a fiber reinforced composite material is produce by the autoclave molding method using a prepreg containing a bismaleimide-based resin composition. The autoclave molding method is a molding method in which a prepreg is laminated in a molding die, and the resulting laminated product is enclosed in a bagging film and then heated and pressurized in an autoclave, while the air and volatile materials are removed under a vacuum, to heat cure the prepreg. The pressure inside the autoclave is generally from 0.6 to 1.0 (MPa).

The autoclave molding method can obtain a highly reliable fiber reinforced composite material. However, an autoclave molding apparatus having high pressurizing capacity is large in size and expensive in price and requires a large amount of equipment investment, causing a limitation to application of the autoclave molding method.

Thus, there is a demand for a method for producing a highly reliable fiber reinforced composite material in which a prepreg is cured without using an autoclave molding apparatus, or using an autoclave molding apparatus having low pressurizing capacity.

CITATION LIST

Patent Literatures

Patent Literature 1: JP 2019-157097 A

SUMMARY

An object of the present invention is to provide a method for producing a highly reliable fiber reinforced composite material in which a prepreg is cured without using an autoclave molding apparatus, or using an autoclave molding apparatus having low pressurizing capacity.

The present inventors have found that the above-mentioned problems can be solved by heating a prepreg stepwise at prescribed temperatures at the time of molding the prepreg, thereby completing the present invention.

The present invention for solving the above-mentioned problems is as follows.

[1] A method fox producing a composite material including a step of curing a prepreg consisting of a fiber reinforcement material and a resin composition containing a bismaleimide resin, the method including:

a first heating step in which the prepreg is heated to a first temperature ($T_1$) and held at the first temperature ($T_1$) for 30 minutes or more to impregnate the resin composition into a fiber; and a curing step in which the prepreg is heated to a third temperature ($T_3$) higher than the first temperature ($T_1$) and hold at the third temperature ($T_3$) to cure the resin composition, in which the first temperature ($T_1$) satisfies the following formula (1):

$$Tb \leq T_1 \leq Ta \quad (1)$$

where Ta is a temperature at which the resin composition exhibits a minimum viscosity and Tb is a temperature at which the resin composition exhibits the viscosity of 100 [Pa·s].

The invention described in the above [1] is the method for molding the prepreg consisting of the fiber reinforcement material and the bismaleimide-based resin composition and characterized by including the first heating step in which the prepreg is heated at the temperature $T_1$ at which the viscosity of the bismaleimide-based resin composition is low for the prescribed period of time before the prepreg is heated at the curing temperature $T_3$ of the bismaleimide-based resin composition. This first heating step allows the bismaleimide-based resin composition to be sufficiently impregnated into the fiber reinforcement material. As a result, in the fiber reinforced composite material thus obtained, the occurrence of voids due to the lack of impregnation of the bismaleimide-based resin composition can be reduced.

[2] The method for producing a composite material according to [1], further including a second heating step of holding the prepreg at a second temperature ($T_2$) for 30 minutes or more between the first heating step and the curing step, wherein the second temperature ($T_2$) satisfies the following formula (2):

$$T_2 = Tc \pm 20 [° C.] \quad (2)$$

where Tc is a peak temperature showing a maximum peak among the peaks observed in a range from 90 to 180 [° C.] in a total ion current chromatogram (TIC) of the prepreg measured at a temperature rising rata of 10 [° C./min] using a thermal gravimetric mass spectrometry apparatus (TG-MS).

The invention described in the above [2] further includes the second heating step of removing under a vacuum a volatile material resulting from the bismaleimide-based resin composition. This second heating step can sufficiently remove under a vacuum the volatile component mainly resulting from the bismaleimide-based resin composition. As a result, in the fiber reinforced composite material thus obtained, the occurrence of voids due to the volatile component of the bismaleimide-based resin composition can be reduced.

[3] The method for producing a composite material according to [2], having a setting of the first temperature ($T_1$)<the second temperature ($T_2$)<the third temperature ($T_3$).

The invention described in the above [3] has a setting of the first temperature ($T_1$)<the second temperature ($T_2$)<the third temperature ($T_3$), allowing the prepreg to be molded in the composite material through three temperature zones having different roles.

[4] The method for producing a composite material according to [1], in which a pressure during molding is set to 0.5 [MPa] or less.

The invention described in the above [4] is a method for molding a composite material in which the prepreg is molded under no pressure or a low pressure.

[5] The method for producing a composite material according to [1], in which the fiber reinforcement material is a carbon fiber.

[6] The method for producing a composite material according to [1], in which the resin composition includes, as an essential component, a component (a), which is a bismaleimide compound, and a component (b), which is an alkenyl phenol compound and/or an alkenyl phenol ether compound.

The invention described in the above [5] and [6] is a method for molding a composite material in which the fiber reinforcement material of the resin composition constituting the prepreg is limited to the prescribed material.

The method for producing a composite material including a step of curing the prepreg of the present invention makes it possible to produce a high-quality fiber reinforced composite material under no pressure or a low pressure by heating the prepreg at the prescribed temperature zone lower than the curing starting temperature for the prescribed period of time. Thus, a high-quality fiber reinforced composite material can be produced without using an autoclave molding apparatus.

DETAILED DESCRIPTION

Hereinafter, a method for producing a composite material of the present invention will be described in detail.

In the method for producing a composite material of the present invention, a prescribed prepreg is molded under a prescribed condition.

The prepreg to which the production method of the present invention is applied consists of a fiber reinforcement material and a bismaleimide-based resin composition formed by including a bismaleimide resin in an uncured state. In the prepreg, the fiber reinforcement material and the bismaleimide-based resin composition are integrated with each other in advance in a manner such that, a part, or the whole of the bismaleimide-based resin composition is impregnated into the fiber reinforcement material.

(1) First Heating Step

The prepreg molding method of the present invention includes a first heating step in which the prepreg is heated at a temperature ($T_1$) and held at this temperature ($T_1$) for 30 minutes or more. The temperature ($T_1$) is lower than a curing temperature ($T_1$) of the bismaleimide-based resin compound. The first heating step is a step in which the bismaleimide-based resin composition is impregnated into the fiber reinforcement material in a state of high fluidity of the bismaleimide-based resin composition constituting the prepreg to replace voids inside the fiber reinforcement material with the bismaleimide-based resin composition under a vacuum and heating, thereby removing the voids from the prepreg.

The temperature ($T_1$) at which the prepreg is held in the first heating step facilitates impregnation and satisfies the following formula (1).

$$Tb \leq T_1 \leq Ta \qquad (1)$$

where Ta is a temperature at which the resin composition exhibits a minimum viscosity and Tb is a temperature at which the resin composition exhibits the viscosity of 100 [Pa·s].

The temperature ($T_1$) is preferably Td or higher, more preferably Te or higher.

Td: temperature at which resin composition exhibits viscosity of 50 [Pa·s] (where Td≤Ta)

Te: temperature at which resin composition exhibits viscosity of 15 [Pa·s] (where Te≤Ta)

The term "being held at the temperature ($T_1$) for 30 minutes or more" described herein does not mean "being gradually heated from Tb to Ta at a constant temperature rising rate, rather means "being held at the constant temperature ($T_1$) within a range from Tb to Ta for 30 minutes or more". The term "being held at the constant temperature ($T_1$) for 30 minutes or more" means that the prepreg is held in a range of the temperature ($T_1$)±10° C. for 30 minutes or more (note that the average temperature during the holding time is Tb or higher).

When the heating is performed for the prescribed period of time at around the temperature where the viscosity of the bismaleimide-based resin composition is low, the bismaleimide-based resin composition can be sufficiently impregnated into the fiber reinforcement material without applying high pressure. When the heating temperature is higher than Ta, voids tend to occur in the obtained fiber reinforced composite material due to insufficient impregnation of the resin composition.

The specific temperature of $T_1$ varies depending on the composition of the bismaleimide-based resin composition. However, it is generally from 60 to 130 [° C.], preferably from 80 to 110 [° C.].

In the present invention, the temperatures Ta, Tb, Td, and Te defined by the viscosity of the bismaleimide-based resin composition can be determined from a temperature-viscosity curve of the bismaleimide-based resin composition measured by using a rheometer.

The time for holding the prepreg at the temperature ($T_1$) in the first heating step is 30 minutes or more, preferably 45 minutes or more, more preferably 60 minutes or more. The upper limit of the holding time is not particularly limited. However, it is preferably 12 hours or less, more preferably 6 hours or less in consideration of productivity.

(2) Second Heating Step

The prepreg molding method of the present invention preferably includes the second heating step of holding the prepreg at the temperature ($T_2$) for 30 minutes or more after the above first heating step but before the curing of the bismaleimide-based resin composition. The second heating step is a step of removing, under a vacuum and heating, a moisture remaining in the prepreg and a volatile component caused by a chemical reaction of the bismaleimide-based resin composition.

The temperature ($T_2$) at which the prepreg is held in the second heating step is a temperature for removing the volatile content and satisfies the following formula (2).

$$T_2 = Tc \pm 20 [° C.] \qquad (2)$$

where Tc is a peak temperature showing a maximum peak among the peaks observed in a range from 90 to 180 [° C.] in a total ion current chromatogram (TIC) of the prepreg measured at a temperature rising rate of 10 [° C./min] using a thermal gravimetric mass spectrometry apparatus (TG-MS).

Note that, the total ion current chromatogram (TIC) is a chart in which the total counts of all ions generated by an ion source are plotted on the vertical axis and the time is plotted on the horizontal axis.

That is, the temperature ($T_2$) at which the prepreg is held in the second heating step is in a range from (Tc−20) to (Tc+20) [° C.]. The temperature ($T_2$) is preferably in a range from (Tc−10) to (Tc°+20) [° C.], more preferably in a range from Tc to (Tc+20) [° C.].

Heating at this temperature for 30 minutes or more can sufficiently remove the volatile component mainly derived from the bismaleimide-based resin composition from the prepreg without applying high pressure. When the heating temperature is (Tc−20) [° C.] or higher, the volatile component can be particularly sufficiently removed. When the heating temperature is (Tc+20) [° C.] or lower, the viscosity is hardly increased by the partial curing reaction of the bismaleimide-based resin composition before the volatile component is removed, thus the volatile component can be particularly sufficiently removed. As a result, the voids occurring in the obtained fiber reinforced composite material due to the volatile component resulting from the prepreg can be particularly reduced.

The term "being held at the temperature ($T_2$) for 30 minutes or more" described herein does not mean "being gradually heated from (Tc−20) to (Tc+20) at a constant temperature rising rate, rather means "being held at the constant temperature ($T_2$) within a range from (Tc−20) to (Tc+20) for 30 minutes or more". The term "being held at the constant temperature ($T_2$) for 30 minutes or more" means that the prepreg is held in a range of the temperature ($T_2$)±10° C. for 30 minutes or more (note that the average temperature during the holding time is (Tc−20) or higher).

The specific temperature of $T_2$ varies depending on the volatile component included in the bismaleimide-based resin composition. However, it is generally from 110 to 160 [° C.], preferably from 130 to 150 [° C.].

The time for holding the prepreg at the temperature ($T_2$) in the second heating step is 30 minutes or more, preferably 45 minutes or more, more preferably 60 minutes or more. The upper limit of the holding time is not particularly limited. However, it is preferably 12 hours or less, more preferably 6 hours or less in consideration of productivity.

(3) Curing Step

The prepreg molding method of the present invention includes a curing step of curing the bismaleimide-based resin composition by heating at the prescribed temperature or higher after the first heating step and/or the second heating step described above.

The heating temperature $T_3$ in the curing step is a curing temperature of the bismaleimide-based resin composition and varies depending on the composition thereof. However, it is generally from 160 to 205 [° C.], preferably from 170 to 195 [° C.], more preferably from 175 to 190 [° C.].

In the prepreg molding method of the present invention, the prepreg is heated stepwise with a setting of the temperature ($T_1$)<the temperature ($T_2$)<the temperature ($T_3$). The difference between the temperatures $T_1$ and $T_2$ and the difference between the temperatures $T_2$ and $T_3$ are each preferably 10 [° C.] or more. Further, the difference between $T_1$ and $T_3$ is preferably 20 [° C.] or more, more preferably 50 [° C.] or more. Heating at these temperatures sufficiently different from each other ($T_1$ and $T_2$, and, $T_2$ and $T_3$) can significantly reduce formation of voids caused by the insufficient impregnation and the volatile component, respectively.

(4) Prepreg

The prepreg applied to the method for producing a composite material of the present invention consists of the fiber reinforcement material and the bismaleimide-based resin composition formed by including the bismaleimide resin in an uncured state.

(4-1) Bismaleimide-Based Resin Composition

The bismaleimide resin composition is formed by including a known bismaleimide compound and various additives such as a thermoplastic resin, a filler, and a pigment to be added as necessary.

As the bismaleimide compound (hereinafter, also referred to as "BMI") compounded in the bismaleimide resin composition, a conventionally known bismaleimide compound can be used. For example, the bismaleimide compound represented by the following chemical formula (1) can be mentioned.

[Chemical 1]

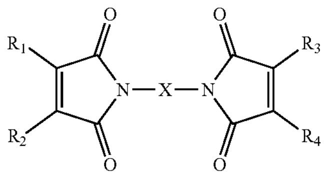

(1)

[in the chemical formula (1), $R_1$ to $R_4$ each independently represent a group selected from the group consisting of —H, —$CH_3$, —$C_2H_5$, —$C_3H_7$, —F, —Cl, —Br, and —I; X is described later]

In the present invention, the bismaleimide compound preferably includes an aromatic bismaleimide and may include an aliphatic bismaleimide. In the present invention, the amount of the aromatic bismaleimide with respect to the whole bismaleimide compound included in the prepreg is preferably 70 weight % or more.

(4-1-1) Aromatic Bismaleimide Compound

In a case where the bismaleimide compound includes an aromatic ring structure (hereinafter, also referred to as "aromatic bismaleimide compound", X in the chemical formula (1) preferably has structures described in the following chemical formulae (2) to (8).

[Chemical 2]

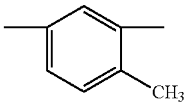

(2)

[Chemical 3]

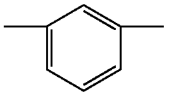

(3)

[Chemical 4]

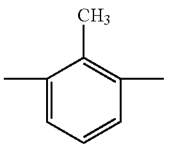

(4)

-continued

[Chemical 5]

(5)

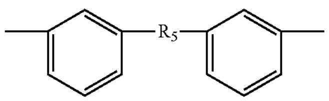

[in the chemical formula (5), $R_5$), $R_5$ represents —$CH_2$—, —C $(CH_3)_2$—, —O—, or —$SO_2$—.]

[Chemical 6]

(6)

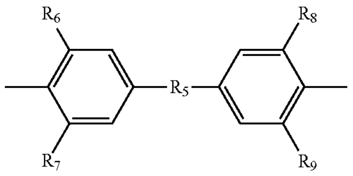

[in the chemical formula (6), $R_5$ represents —$CH_2$—, —$C(CH_3)_2$—, —O—, or —$SO_2$—. $R_6$ to $R_9$ each independently represent, a group selected from the group consisting of —H, —$CH_3$, —$C_2H_3$, —$C_3H_2$, —F, —Cl, —Br, and —I.]

[Chemical 7]

(7)

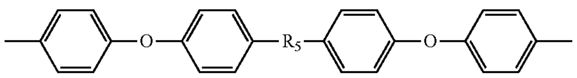

[in the chemical formula (7), $R_5$ represents —$CH_2$—, —$C(CH_3)_2$—, —O—, or —$SO_2$—.]

[Chemical 8]

(8)

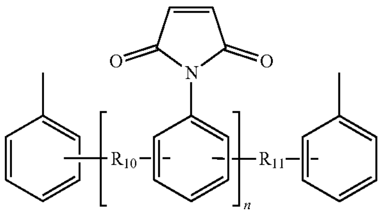

[in the chemical formula (8), $R_{10}$ and $R_{11}$ each independently represent —$CH_2$—, —$C(CH_3)_2$—, —O—, or —$SO_2$—; in the chemical formula (8), n is from 0 to 0.5]

Examples of such an aromatic bismaleimide compound include N,N'-4,4'-diphenylmethane bismaleimide, N,N'-4,4'-diphenyl ether bismaleimide, N,N'-m-phenylene bismaleimide, N,N'-p-phenylene bismaleimide, N,N'-m-toluylene bismaleimide, N,N'-4,4'-biphenylene bismaleimide, N,N'-4,4'-(3,3'-dimethylbiphenylene) bismaleimide, 2,2-bis[4-(4-maleimidephenoxy)phenyl]propane, 3,3'-dimethyl-5,5'-diethyl-4,4'-diphenylmethane bismaleimide, 4-methyl-1,3-phenylene bismaleimide, N,N'-4,4'-diphenylsulfone bismaleimide, and N,N'-4,4'-benzophenone bismaleimide.

From the viewpoint of heat resistance of the fiber reinforced composite material after heat curing, N,N'-4,4'-diphenylmethane bismaleimide, N,N'-4,4'-diphenyl ether bismaleimide, N,N'-m-toluylene bismaleimide, 2,2-bis[4-(4-maleimidephenoxy)phenyl]propane, 4-methyl-1,3-phenylene bismaleimide, N,N',4,4'-diphenylsulfone bismaleimide, and N,N'-4,4'-benzophenone bismaleimide are preferable, and N,N'-4,4'-diphenylmethane bismaleimide, N,N'-4,4'-diphenyl ether bismaleimide, N,N'-m-toluylene bismaleimide, 2,2-bis[4-(4-maleimidephenoxy) phenyl]propane, and 4-methyl-1,3-phenylene bismaleimide are particularly preferable. These aromatic bismaleimide compounds may be used solely or may be used in combination of two or more thereof.

The content of the aromatic bismaleimide compound in the bismaleimide-based resin composition is preferably from 20 to 80 weight %, more preferably from 30 to 65 weight %, particularly preferably from 35 to 60 weight %, with respect to the total mass of the present resin composition. When the content of the aromatic bismaleimide compound is within this range, it becomes easy to adjust the viscosity of the resin composition to an appropriate range and reduce voids during molding. Further, the fiber reinforced composite material excellent in both heat resistance and impact resistance can be easily obtained. When the content of the aromatic bismaleimide compound is less than 20 weight %, heat resistance of the fiber reinforced composite material obtained as a final product using the present resin composition tends to be lowered. When the content of the aromatic bismaleimide compound is more than 80 weight %, impact resistance of the fiber reinforced composite material obtained as a final product using the present resin composition tends to be lowered.

(4-1-2) Aliphatic Bismaleimide Compound

In a case where the bismaleimide compound does not include the aromatic ring structure (hereinafter, also referred to as "aliphatic bismaleimide compound"), X in the chemical formula (1) preferably has structures described in the following chemical formulae (9) to (11).

[Chemical 9]

$$-(CH_2)_n- \quad (9)$$

[in the chemical formula (9), n represents an integer equal to or less than 10, preferably 1, 2, 3, 4, or 6.]

[Chemical 10]

(10)

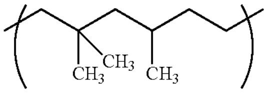

[Chemical 11]

(11)

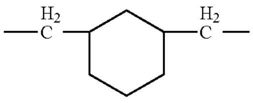

Examples of such an aliphatic bismaleimide compound include 1,6'-bismaleimide-(2,2,4-trimethyl)hexane, hexamethylenediamine bismaleimide, N,N'-1,2-ethylene bismaleimide, N,N'-1,3-propylene bismaleimide, and N,N'-1,4-tetramethylene bismaleimide. Of those, 1,6'-bismaleimide-(2,2,4-trimethyl)hexane and hexamethylenediamine bismaleimide are particularly preferable. These aliphatic bismaleimide compounds may be used solely or may be used in combination of two or more thereof.

The content of the aliphatic bismaleimide compound in the bismaleimide-based resin composition is preferably from 3 to 30 weight %, more preferably from 5 to 20 weight %, particularly preferably from 7 to 15 weight %, with respect to the total mass of the present resin composition. When the compounding amount of the aliphatic bismaleimide compound is less than 3 weight %, impact resistance of the fiber reinforced composite material obtained as a final product using the present resin composition tends to be lowered due to poor toughness. When the content of the aliphatic bismaleimide compound is more than 30 weight %, heat resistance of the fiber reinforced composite material obtained as a final product tends to be lowered.

(4-1-3) Alkenyl Phenol Compound and/or Alkenyl Phenol Ether Compound

The bismaleimide-based resin composition may include an alkenyl phenol compound and/or an alkenyl phenol ether compound. The alkenyl phenol ether compound can be obtained through a reaction between a phenol-based compound and an alkenyl halide. Further, the alkenyl phenol ether compound compounded in the present resin composition can be obtained through Claisen rearrangement of an alkenyl phenol ether compound (JP-A-52-994). In the present invention, the alkenyl phenol compound and/or the alkenyl phenol ether compound may include a rearranged product thereof.

As the alkenyl phenol compound and/or the alkenyl phenyl ether compound, allyl phenol, methallyl phenol, or an ether thereof are preferable. Compounds of the following chemical formulae (12) to (16) are more preferable as the alkenyl phenol compound or the alkenyl phenyl ether compound.

[Chemical 14]

(12)

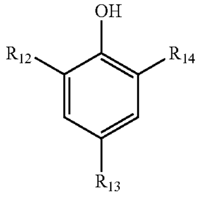

[in the chemical formula (12), $R_{12}$, $R_{13}$, and $R_{14}$ each independently represent hydrogen or an alkenyl group having 2 to 10 carbon atoms, and preferably an allyl group or a propenyl group, provided that at least one of $R_{12}$, $R_{13}$, and $R_{14}$ is an alkenyl group having 2 to 10 carbon atoms.]

[Chemical 15]

(13)

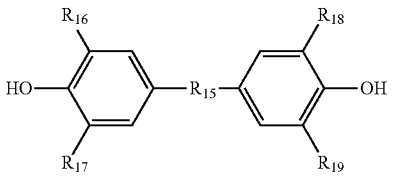

[in the chemical formula (13), $R_{15}$ represents a direct bond, $-CH_2-$, $-C(CH_3)_2-$, —O—, —S—, —SO—, or $-SO_2-$; $R_{16}$, $R_{17}$, $R_{18}$, and $R_{19}$ each independently represent hydrogen or an alkenyl group having 2 to 10 carbon atoms, and preferably an allyl group or a propenyl group, provided that at least one of $R_{16}$, $R_{17}$, $R_{18}$, and $R_{19}$ is an alkenyl group having 2 to 10 carbon atoms.]

Among the compounds of the chemical formula (13), compounds of the following chemical formula (14) are particularly preferable.

[Chemical 16]

(14)

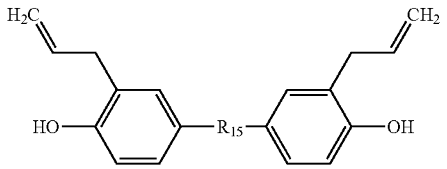

[in the chemical formula (14), $R_{15}$ represents a direct bond, $-CH_2-$, $-C(CH_3)-$, —O—, —S—, —SO—, or $-SO_2-$.]

[Chemical 17]

(15)

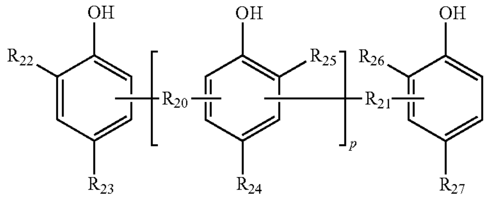

[in the chemical formula (15), $R_{20}$ and $R_{21}$ represent a direct bond, $-CH_2-$, $-C(CH_3)_2-$, —O—, —S—, —SO—, or $-SO_2-$; $R_{22}$, $R_{23}$, $R_{24}$, $R_{25}$, $R_{26}$, and $R_{27}$ each independently represent hydrogen, an alkyl group having 1 to 4 carbon atoms, or alkenyl group having 2 to 10 carbon atoms, and preferably an allyl group or a propenyl group, provided that at least one of $R_{22}$, $R_{23}$, $R_{24}$, $R_{25}$, $R_{26}$, and $R_{27}$ is an alkenyl group having 2 to 10 carbon atoms; F represents an integer from 0 to 10.]

[Chemical 18]

(16)

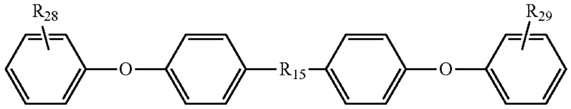

[in the chemical formula (16), $R_{15}$ represents a direct bond, $-CH_2-$, $-C(CH_3)_2-$, —O—, —S—, —SO—, or $-SO_2-$; $R_{28}$ and $R_{29}$ each independently represent, hydrogen, an alkyl group having 1 to 4 carbon atoms, or alkenyl group having 2 to 10 carbon atoms, and preferably an allyl group or a propenyl group, provided that at least one of $R_{28}$ and $R_{29}$ is an alkenyl group having 2 to 10 carbon atoms.]

Examples of such an alkenyl phenol compound or alkenyl phenol ether compound include O,O'-diallylbisphenol A, 4,4'-dihydroxy-3,3'-diallyldiphenyl, bis(4-hydroxy-3-allylphenyl)methane, 2,2'-bis(4-hydroxy-3,5-diallylphenyl)propane, 2,2'-diallylbisphenol F, 4,4'-dihydroxy-3,3'-diallyidiphenyl ether, and 4,4'-bis-O-propenylphenoxybenzophenone. Of those, O,O'-diallylbisphenol A, 2,2'-bis(4-hydroxy-3,5-diallylphenyl)propane, 2,2'-diallylbisphenol F, and the like are preferable because of a high glass transition point of the resin after heat curing. O,O'-diallylbisphenol A is particularly preferable as it reduces the viscosity of the present resin composition. In the present resin composition, the alkenyl phenol compound and/or the alkenyl phenol ether compound may be used solely or may be used in admixture of two or more thereof.

The alkenyl phenol compound and/or the alkenyl phenol ether compound function as a curing agent of the bismaleimide compound. The compounding amount in the present resin composition is preferably from 10 to 70 [weight %], more preferably from 20 to 50 [weight %], particularly preferably from 25 to 40 [weight %]. The viscosity of the present resin composition is adjusted by appropriately including the alkenyl phenol compound and/or the alkenyl phenol ether compound within the above prescribed range, making it possible to obtain excellent molding processability. Further, the present resin composition is sufficiently impregnated into the reinforcement fiber material, allowing the present resin composition to be sufficiently contact to the reinforcement fiber material.

In the present resin composition, a part or the whole of the aromatic bismaleimide compound and/or the aliphatic bismaleimide compound may be dissolved in the alkenyl phenol compound and/or the alkenyl phenol ether compound. The present resin composition is preferably formed by including a liquid component and a solid component. A ratio of the solid component in the resin composition is preferably from 5 to 50 [weight %], more preferably from 15 to 45 [weight %], particularly preferably from 25 to 40 [weight %]. When the ratio of the solid component is within this range, it becomes easy to adjust the viscosity of the resin composition to an appropriate range and reduce voids during molding. Note that the solid component in the present invention refers to a component which is present in a solid state in the resin composition with a temperature of 80 [° C.]. The bismaleimide compound among the solid components is dissolved in the resin composition at the molding temperature or lower of the prepreg constituted by using the present resin composition. Further, the liquid component refers to a component which is present, in a liquid state in the resin composition with a temperature of 80 [° C.].

When the ratio of the solid component in the resin composition is more than 50 [weight %], the viscosity of the resin composition may significantly increase. As a result, handleability may be significantly deteriorated in the production step of the resin composition and the production step of the prepreg. When the ratio of the solid component in the resin composition is less than 5 [weight %], the bismaleimide compound is dissolved in the alkenyl phenol compound and/or alkenyl phenol ether compound. In such a case, heating upon this dissolution may simultaneously cause the progression of the curing reaction, which in turn increases the viscosity of the resin composition through polymerization. As a result, handleability may be significantly deteriorated in the production step of the resin composition and the production step of the prepreg.

(4-1-4) Thermoplastic Resin

The present resin composition preferably includes a thermoplastic resin. As the thermoplastic resin, a known thermoplastic resin can be used. Both the thermoplastic resin soluble in the alkenyl phenol compound and/or the alkenyl, phenyl ether compound (hereinafter, also referred to as "soluble thermoplastic resin") and the thermoplastic resin insoluble in the alkenyl phenol compound and/or the alkenyl phenyl ether compound (hereinafter, also referred to as "insoluble thermoplastic resin") can be used.

In the present invention, the term "soluble in the alkenyl phenol compound and/or the alkenyl phenyl ether compound" means that a part or the whole of the thermoplastic resin can be solved in the alkenyl phenol compound and/or the alkenyl phenyl ether compound under the temperature condition for molding the fiber reinforced composite material. The soluble thermoplastic resin is dissolved in the resin composition to increase the viscosity thereof when the resin composition is heated in the molding process of the fiber reinforced composite material. This can prevent a flow of the resin composition in the molding process.

Examples of the soluble thermoplastic resin include polyethersulfone, polysulfone, polyetherimide, and polyimide.

In a case where the soluble thermoplastic resin is compounded, the content thereof is preferably from 0.1 to 15 [weight %], more preferably from 1 to 10 [weight %]. When the content of the soluble thermoplastic resin is within this range, the viscosity of the resin composition can be easily adjusted to an appropriate range. When the content of the soluble thermoplastic resin is more than 15 [weight %], the viscosity of the resin composition becomes high and handleability may be significantly deteriorated.

The insoluble thermoplastic resin is compounded in the present resin composition as necessary. In the present invention, the term "thermoplastic resin insoluble in the alkenyl phenol compound and/or the alkenyl phenyl ether compound" refers to a thermoplastic resin insoluble in the alkenyl phenol compound and/or the alkenyl phenyl ether compound at least under the temperature condition for molding the fiber reinforced composite material. Examples of the insoluble thermoplastic resin include a polyimide resin.

In a case where the insoluble thermoplastic resin is compounded, the content thereof is preferably from 0.1 to 40 [weight %], more preferably from 1 to 20 [weight %]. When the insoluble thermoplastic resin is compounded within this range, it becomes easy to adjust the viscosity of the resin composition to an appropriate range, reduce voids during molding, and obtain the fiber reinforced composite material excellent in impact resistance. When the content of the insoluble thermoplastic resin is more than 40 [weight %], the viscosity of the resin composition becomes high and handleability may be significantly deteriorated. The particle diameter of the insoluble thermoplastic resin is not particularly limited. However, it is preferably from 0.1 to 100 [μm], more preferably from 1 to 50 [μm].

(4-1-5) Other Components

The present resin composition may include other components as long as heat resistance, molding processability, and toughness are not deteriorated. Examples of other components include a polymerization inhibitor, a conductive particle, a conductive filler, an inorganic filler, a rubber-like component, a toughness-imparting agent, a stabilizer, a releasing agent, a coloring agent, and a thickening agent. The viscosity of the resin composition can be adjusted by adding the thickening agent.

(4-2) Fiber Reinforcement Material

In the present prepreg, examples of the reinforcement fiber constituting the reinforcement fiber material include a carbon fiber, a glass fiber, an aramid fiber, a silicon carbide fiber, a polyester fiber, a ceramic fiber, an alumina fiber, a boron fiber, a metal fiber, a mineral fiber, a rock fiber, and a slug fiber. Of these reinforcement fibers, a carbon fiber, a glass fiber, and an aramid fiber are preferable. A carbon fiber is more preferable from the viewpoint of obtaining a fiber reinforced composite material which has excellent specific strength and specific elastic modulus, light weight, and high strength. Of carbon fibers, a polyacrylonitrile (PAN)-based carbon fiber having excellent tensile strength is particularly preferable.

In a case where the PAN-based carbon fiber is used as the reinforcement fiber, the tensile elastic modulus is preferably from 170 to 600 [GPa], particularly preferably from 220 to 450 [GPa]. Further, the tensile strength is preferably 3920 [MPa] (400 kgf/$mm^2$) or more. Using such a carbon fiber can improve mechanical characteristics of the fiber reinforced composite material.

The shape of the reinforcement, fiber material is not limited. However, it is preferably a sheet-shaped product from the viewpoint of processability. Examples of the reinforcement fiber sheet include a sheet-shaped product in which a large number of reinforcement fibers are arranged in parallel in one direction, a bi-directional woven fabric such as a plain weave and a twill weave, a multi-axial woven fabric, a non-woven fabric, a mat, a knit, a braid, and a paper prepared from the reinforcement fibers through paper making. The thickness of the reinforcement fiber sheet is preferably from 0.01 to 3 [mm], more preferably from 0.1 to 1.5 [mm]. Further, the areal weight of the reinforcement fiber sheet is preferably from 70 to 400 [g/$m^2$], more preferably from 100 to 300 [g/$m^2$].

The content of the resin composition in the present prepreg is preferably from 20 to 60 [weight %], more preferably from 30 to 50 [weight %], with respect to the total mass of the reinforcement fiber material and the resin composition. When the content of the present resin composition is less than 20 [weight %], voids and the like may occur inside the fiber reinforced composite material produced by using such a prepreg. When the content of the present resin composition is more than 60 [weight %], the insufficient content of the reinforcement fiber tends to cause a reduction in the strength of the obtained fiber reinforced composite material.

(5) Fiber Reinforced Composite Material

The fiber reinforced composite material produced by the molding method of the present invention has a void fraction of preferably 1 [%] or less, more preferably 0.1 [%] or less.

The void fraction of the present invention refers to a value measured by image analysis using a cross-section image of the fiber reinforced composite material.

The voids of the fiber reinforced composite material are generated intensively in an interlayer portion. Thus, the generation state of voids generated in the fiber reinforced composite material can be confirmed by measuring the interlayer shear strength. The fiber reinforced composite material produced by the molding method of the present invention exhibits the interlayer shear strength comparable to that of the fiber reinforced composite material molded by the autoclave method using the prepreg having the same composition. A drop rate of the interlayer shear strength (ILSS drop rate) is preferably 28 [%] or less, more preferably 15 [%] or less, still more preferably 7 [%] or less, particularly preferably 5 [%] or less, as compared with the fiber reinforced composite material molded by the autoclave method using the same prepreg.

EXAMPLES

Hereinafter, the present invention will be described in more detail by way of Examples. However, the present invention is not limited by the following Examples.

As raw materials of a prepreg, the followings are used.

[Aromatic Bismaleimide Compound]

BMI1100-H: BMI-1100H (trade name) (N,N'-4,4'-diphenylmethane bismaleimide, manufactured by Daiwa Kasei Industry Co., Ltd.)

TDAB: Compimide TDAB (trade name) (toluene-2,4-bismaleimide, manufactured by Evonik Industries AG)

[Aliphatic Bismaleimide Compound]

BMI-TMH: BMI-TMH (trade name) (1,6'-bismaleimide-(2,2,4-trimethyl) hexane, manufactured by Daiwa Kasei Industry Co., Ltd.)

[Co-Reactant]

DABPA: DABPA (trade name) (2,2'-diallylbisphenol A, manufactured by Daiwa Kasei Industry Co., Ltd.)

[Soluble Thermoplastic Resin]

Ultem1000-1000 (trade name) crushed product (polyetherimide, manufactured by Saudi Basic Industries Corp., average particle diameter of 15 [μm])

[Insoluble Thermoplastic Resin]

AURUM PD450M (trade name) (polyimide, manufactured by Mitsui Chemicals, Inc.)

P94 (trade name) (polyimide, manufactured by HP Polymers Ltd.)

[Carbon Fiber]

"Tenax" (trade name) IMS 65 E 23 24K 830tex (carbon fiber strand, manufactured by Teijin Ltd., tensile elastic modulus: 290 [GPa])

"Tenax" (trade name) HTS 40 E 13 6K 400tex (carbon fiber strand, manufactured by Teijin Ltd., tensile elastic modulus: 240 [GPa])

"Tenax" (trade name) UMS 55 F 23 12K 360tex (carbon fiber strand, manufactured by Teijin Ltd., tensile elastic modulus: 550 [GPa])

Physical properties of the fiber reinforced composite material were measured by the following methods.

[Void Fraction]

A BMI prepreg was laminated in the sequence of [45°/−45°/0/90°]5 s and cured under the molding conditions shown in Table 1 to obtain a composite. The center part of the composite was cut, and acquired a cross-section image of the composite using a digital microscope VHX-5000 (manufactured by Keyence Corp.). The void fraction was measured by the automatic area measuring function of VHX-5000.

[Interlayer Shear Strength]

The measurement was performed according to ASTM D2344 test method. A drop rate obtained in comparison with Reference example 1 was defined as the interlayer shear strength drop rate (ILSS drop rate).

[Compression after Impact Strength (CAI)]

The measurement was performed according to ASTM-D7136 and ASTM-D7137 test methods.

[Temperature-Viscosity Curve]

The viscosity of the bismaleimide-based resin composition was measured using a rheometer ARSS-RDA manufactured by TA Instruments. Using a parallel plate having a diameter of 40 mm, the thickness of the resin between the parallel plates was set to 0.5 mm, and then the viscosity was measured up to 200° C. at a temperature rising rate of 2° C./min under the condition of an angular velocity of 10 radians/sec. Ta, Tb, Td, and Te were determined from the temperature-viscosity curve thus obtained.

Ta: temperature at which resin composition exhibits minimum viscosity

Tb: temperature at which resin composition exhibits viscosity of 100 [Pa·s]

Td: temperature at which resin composition exhibits viscosity of 50 (Pa·s) (where temperature is lower than temperature Ta having minimum viscosity)

Te: temperature at which resin composition exhibits viscosity of 15 [Pa·s] (where temperature is lower than temperature Ta having minimum viscosity)

[TG-MS TIC]

The prepreg was subjected to thermal gravimetric mass spectrometry measurement using an apparatus in which TG-DSC/DTA STA 449 F1 Jupiter manufactured by NETZSCH-Gerätebau GmbH was coupled with a mass spectrometer QMS manufactured by NETZSCH-Gerätebau GmbH. The thermal gravimetric mass spectrometry measurement was performed from room temperature to 180° C. at a temperature rising rate of 2° C./min under He atmosphere, and Tc was determined from the total ion current chromatogram (TIC) thus obtained.

Tc: a peak temperature showing a maximum peak among the peaks observed in a range from 90 to 180 [° C.] in a total ion current chromatogram (TIC) of the prepreg measured at a temperature rising rate of 10 [° C./min] using a thermal gravimetric mass spectrometry apparatus (TG-MS).

Total ion current chromatogram (TIC): chart in which total counts of all ions generated by ion source are plotted on vertical axis and time is plotted on horizontal axis.

Production of Prepreg

Production Example 1

A bismaleimide-based resin composition was prepared in the composition shown in Production example 1 in Table 1. Ta, Tb, Td, and Te of this bismaleimide-based resin composition were 123 [° C.], 63 [° C.], 70 [° C.], and 82 [° C.], respectively.

This bismaleimide-based resin composition was applied on a release film with an areal weight of 50 [g/$m^2$] using a film coaler as a one-side resin film to obtain a resin sheet. Next/the carbon fiber (IMS 65) strands were fed between two resin sheets and uniformly arranged in one direction (carbon fiber volume content of 57 [vol %], areal weight of 190 [g/$m^2$]), thereby being formed into a sheet. The resulting product was pressurized and heated at 100 [° C.] using a roller to obtain a prepreg. In this prepreg, the peak temperature (Tc) showing the maximum peak among the peaks observed in a range from 90 to 180 [° C.] in the total ion current chromatogram (TIC) obtained by the thermal gravimetric mass spectrometry measurement (TG-MS) was 135 [° C.].

Production Example 2

A bismaleimide-based resin composition was prepared in the composition shown in Production example 2 in Table 1. Ta, Tb, Td, and Te of this bismaleimide-based resin composition were 125 [° C.], 64 [° C.], 69 [° C.], and 82[° C.] respectively. This bismaleimide-based resin composition was applied on a release film with an areal weight of 50 [g/$m^2$] using a film coater as a one-side resin film to obtain a resin sheet. Next, the carbon fiber (IMS 65) strands were fed between two resin sheets and uniformly arranged in one direction (carbon fiber volume content of 57 [vol %], areal weight of 190 [g/$m^2$]), thereby being formed into a sheet. The resulting product was pressurized and heated at 100 [° C.] using a roller to obtain a prepreg. In this prepreg, the peak temperature (Tc) showing the maximum peak among the peaks observed in a range from 90 to 130 [° C.] in the total ion current chromatogram (TIC) obtained by the thermal gravimetric mass spectrometry measurement (TG-MS) was 135 [° C.].

Production Example 3

A bismaleimide-based resin composition was prepared in the composition shown in Production example 3 in Table 1. Ta, Tb, Td, and Te of this bismaleimide-based resin composition were 150 [° C.], 60 [° C.], 66 [° C.], and 79 [° C.], respectively. This bismaleimide-based resin composition was applied on a release film with an areal weight of 50 [g/$m^2$] using a film coater as a one-side resin film to obtain a resin sheet. Next, the carbon fiber (IMS 65) strands were fed between two resin sheets and uniformly arranged in one direction (carbon fiber volume content of 57 [vol %], areal weight of 190 [g/$m^2$]), thereby being formed into a sheet. The resulting product was pressurized and heated at 100 [° C.] using a roller to obtain a prepreg. In this prepreg, the peak temperature (Tc) showing the maximum peak among the peaks observed in a range from 90 to 180 [° C.] in the total ion current chromatogram (TIC) obtained by the thermal gravimetric mass spectrometry measurement (TG-MS) was 135 [° C.].

Production Example 4

A bismaleimide-based resin composition was prepared in the composition shown in Production example 4 in Table 1. Ta, Tb, Td, and Te of this bismaleimide-based resin composition were 123 [° C.], 63 [° C.], 70 [° C.], and 82 [° C.], respectively. This bismaleimide-based resin composition was applied on a release film with an areal weight of 50 [/$m^2$] using a film coaler as a one-side resin film to obtain a resin sheet. Next, the carbon fiber (HTS 40) strands were fed between two resin sheets sand uniformly arranged in one direction (carbon fiber volume content of 57 [vol %], areal weight of 190 [g/$m^2$]), thereby being formed into a sheet. The resulting product was pressurized and heated at 100 [° C.] using a roller to obtain a prepreg. In this prepreg, the peak temperature (Tc) showing the maximum peak among the peaks observed in a range from 90 to 180 [° C.] in the total ion current chromatogram (TIC) obtained by the thermal gravimetric mass spectrometry measurement (TG-MS) was 135 [° C.].

Production Example 5

A bismaleimide-based resin composition was prepared in the composition shown in Production example 5 in Table 1. Ta, Tb, Td, and Te of this bismaleimide-based resin composition were 123 [° C.], 63 [° C.], 70 [° C.], and 82 [° C.], respectively. This bismaleimide-based resin composition was applied on a release film with an areal weight of 50 [g/$mg^2$] using a film coater as a one-side resin film to obtain a resin sheet. Next, the carbon fiber (UMS55) strands were fed between two resin sheets and uniformly arranged in one direction (carbon fiber volume content of 57 [vol %], areal weight of 190 [g/$m^2$]), thereby being formed into a sheet. The resulting product was pressurized and heated at 100 [° C.], using a roller to obtain a prepreg. In this prepreg, the peak temperature (Tc) showing the maximum peak among the peaks observed in a range from 90 to 130 [° C.], in the total ion current chromatogram (TIC) obtained by the thermal gravimetric mass spectrometry measurement (TG-MS) was 135 [° C.].

Production Example 6

A bismaleimide-based resin composition was prepared in the composition shown in Production example 6 in Table 1. Ta, Tb, Td, and Te of this bismaleimide-based resin composition were 123 [° C.], 63 [° C.], 70 [° C.], and 32 [° C.], respectively. This bismaleimide-based resin composition was applied on a release film with an areal weight of 50 [g/m$^2$] using a film coater as a one-side resin film to obtain a resin sheet. Next, the carbon fiber (IMS 65) strands were fed between two resin sheets and uniformly arranged in one direction (carbon fiber volume content of 65 [vol %], areal weight of 270 [g/m$^2$], thereby being formed into a sheet. The resulting product was pressurized and heated at 100 [° C.] using a roller to obtain a prepreg. In this prepreg, the peak temperature (Tc) showing the maximum peak among the peaks observed in a range from 90 to 180 [° C.] in the total ion current chromatogram (TIC) obtained by the thermal gravimetric mass spectrometry measurement (TG-MS) was 135 [° C.].

Reference Example 1

The prepreg obtained in Production example 1 was laminated in the sequence of [45°/−45°/0°/90°]5 s and cured in an autoclave at the temperature ($T_3$) of 180 [° C.] under the pressure condition of 0.6 (MPa) to obtain a fiber reinforced composite material. The stepwise heating at the temperature ($T_1$) and the temperature ($T_2$) was omitted. The void fraction of this fiber reinforced composite material was 0.04 [%].

Example 1, Comparative Examples 1 to 3

The prepreg obtained in Production example 1 was laminated in the sequence of [45°/−45°/0°/90°]5 s, held in an autoclave at the temperature ($T_1$) for the period of time shown in Table 2 under the pressure condition of 0.3 [MPa], and then cured at the temperature ($T_3$) of 180 [° C.] to obtain a fiber reinforced composite material. The heating at the temperature ($T_2$) was omitted. The void fraction and the ILSS drop rate with respect to Reference example 1 of this fiber reinforced composite material were as shown in Table 2. The fiber reinforced composite material in Example 1 in which $T_1$ in the first heating step satisfied the formula (1): Tb 63 [° C.])≤$T_1$ (90 [° C.])≤Ta (123 [° C.]) exhibited the performance substantially comparable to that of the fiber reinforced composite material molded by the conventional autoclave molding method using high pressure (Reference example 1).

Examples 2 to 6

The prepreg obtained in Production example 1 was laminated in the sequence of [45°/−45°/0°/90°]5 s, held in an autoclave at the temperature ($T_1$) of 90 [° C.] for 60 minutes under the pressure condition shown in Table 3, then further held at the temperature ($T_2$) for the period of time shown in Table 3, end cured at the temperature ($T_3$) of 180 [° C.] to obtain a fiber reinforced composite material. The void fraction and the ILSS drop rate with respect to Reference example 1 of this fiber reinforced composite material were as shown in Table 3. Examples 4 to 6 including the first heating step and the second heating step showed further satisfactory results.

Examples 7 and 8

A fiber reinforced composite material was obtained by the same operation as in Example 6 except that the prepreg with the different kind and compounding amount of the insoluble thermoplastic resin was used. The void fraction, the ILSS drop rate with respect to Reference example 1, and the impact resistance (CAI) of this fiber reinforced composite material were as shown in Table 4. Satisfactory results were also obtained even when the insoluble thermoplastic resin was changed.

Examples 9 and 10

A fiber reinforced composite material was obtained by the same operation as in Example 6 except that the carbon fiber from the different brand was used in the prepreg. The void fraction of this fiber reinforced composite material was as shown in Table 5. Satisfactory results were also obtained even when the fiber brand was changed.

Comparative Example 4, Examples 11 and 12

As in Production example 6, the prepreg having the high fiber volume content was laminated in the sequence of [45°/−45°/0°/90°]5 s, held in an autoclave at the temperature ($T_1$) and the temperature ($T_2$) shown in Table 6 for the period of time shown in Table 6 under the pressure condition of 0.3 [MPa], and then cured at the temperature ($T_3$) of 180 [° C.] to obtain a fiber reinforced composite material. The void fraction and the ILSS drop rate with respect to Reference example 1 of this fiber reinforced composite material were as shown in Table 6. When the carbon fiber volume content is high, the relative amount of the resin is reduced and voids tend to increase during molding. However, it was confirmed that satisfactory results could be obtained in Examples 11 and 12 having the high carbon fiber volume content by including the first heating step and the second heating step.

TABLE 1

| | | | | Production example 1 | Production example 2 | Production example 3 | Production example 4 | Production example 5 | Production example 6 |
|---|---|---|---|---|---|---|---|---|---|
| Resin composition | Bismaleimide compound | BMI-TMH | Mass | 11.2 | 11.2 | 11.2 | 11.2 | 11.2 | 11.2 |
| | | TDAB | Mass | 20.0 | 20.0 | 20.0 | 20.0 | 20.0 | 20.0 |
| | | BMI1100-H | Mass | 30.6 | 30.6 | 30.6 | 30.6 | 30.6 | 30.6 |
| | Co-reactant | DABPA | Mass | 38.2 | 38.2 | 38.2 | 38.2 | 38.2 | 38.2 |
| | Soluble thermoplastic resin | PEI | Mass | 4.3 | 4.3 | 4.3 | 4.3 | 4.3 | 4.3 |
| | Insoluble thermoplastic resin | AURUM | Mass | 18.4 | — | — | 18.4 | 18.4 | 18.4 |
| | | P84 | Mass | — | 18.4 | — | — | — | — |

TABLE 1-continued

| | | Production example 1 | Production example 2 | Production example 3 | Production example 4 | Production example 5 | Production example 6 |
|---|---|---|---|---|---|---|---|
| Carbon fiber brand | — | IMS 65 | IMS 65 | IMS 65 | HTS 40 | UMS 55 | IMS 65 |
| Carbon fiber volume content | % | 57 | 57 | 57 | 57 | 57 | 65 |
| Ta | ° C. | 123 | 125 | 150 | 123 | 123 | 123 |
| Tb | ° C. | 63 | 64 | 60 | 63 | 63 | 63 |
| Tc | ° C. | 135 | 135 | 135 | 135 | 135 | 135 |
| Td | ° C. | 70 | 69 | 66 | 70 | 70 | 70 |
| Te | ° C. | 82 | 82 | 79 | 82 | 82 | 82 |

TABLE 2

| | | | Reference example 1 | Comparative example 1 | Comparative example 2 | Example 1 | Comparative example 3 |
|---|---|---|---|---|---|---|---|
| Prepreg | | — | Production example 1 | Production example 1 | Production example 1 | Production example 1 | Production example 1 |
| Molding pressure | | MPa | 0.6 | 0.3 | 0.3 | 0.3 | 0.3 |
| First heating step | T1 | ° C. | None | None | 50 | 90 | 140 |
| | Time | min | 0 | 0 | 60 | 60 | 60 |
| Curing step | T3 | ° C. | 180 | 180 | 180 | 180 | 180 |
| Moldability (void fraction) | | % | 0.04 | 5 | 5 | 0.5 | 3 |
| Physical property (ILSS drop rate) | | % | 0 | 30 | 30 | 5 | 27 |

TABLE 3

| | | | Example 1 | Example 2 | Example 3 | Example 4 | Example 5 | Example 6 |
|---|---|---|---|---|---|---|---|---|
| Prepreg | | — | Production example 1 | Production example 1 | Production example 1 | Production example 1 | Production example 1 | Production example 1 |
| Molding pressure | | MPa | 0.3 | 0.15 | 0 | 0.3 | 0.15 | 0 |
| First heating step | T1 | ° C. | 90 | 90 | 90 | 90 | 90 | 90 |
| | Time | min | 60 | 60 | 60 | 60 | 60 | 60 |
| Second heating step | T2 | ° C. | None | None | None | 140 | 140 | 140 |
| | Time | min | 0 | 0 | 0 | 60 | 60 | 60 |
| Curing step | T3 | ° C. | 180 | 180 | 180 | 180 | 180 | 180 |
| Moldability (void fraction) | | % | 0.5 | 0.7 | 1 | 0.05 | 0.06 | 0.07 |
| Physical property (ILSS drop rate) | | % | 5 | 7 | 15 | 0.1 | 0.3 | 0.5 |

TABLE 4

| | | | Reference example 1 | Example 6 | Example 7 | Example 8 |
|---|---|---|---|---|---|---|
| Prepreg | | | Production example 1 | Production example 1 | Production example 2 | Production example 3 |
| Molding pressure | | MPa | 0.6 | 0 | 0 | 0 |
| First heating step | T1 | ° C. | None | 90 | 90 | 90 |
| | Time | min | 0 | 60 | 60 | 60 |
| Second heating step | T2 | ° C. | None | 140 | 140 | 140 |
| | Time | min | 0 | 60 | 60 | 60 |
| Curing step | T3 | ° C. | 180 | 180 | 180 | 180 |
| Moldability (void fraction) | | % | 0.04 | 0.07 | 0.07 | 0.04 |
| Physical property (ILSS drop rate) | | % | 0 | 0.5 | 0.5 | 0 |
| Impact resistance (CAI) | | MPa | 220 | 217 | 205 | 98 |

TABLE 5

| | | | Example 9 | Example 6 | Example 10 |
|---|---|---|---|---|---|
| Prepreg | | — | Production example 4 | Production example 1 | Production example 5 |
| Molding pressure | | MPa | 0 | 0 | 0 |
| First heating step | T1 | ° C. | 90 | 90 | 90 |
| | Time | min | 60 | 60 | 60 |
| Second heating step | T2 | ° C. | 140 | 140 | 140 |
| | Time | min | 60 | 60 | 60 |
| Curing step | T3 | ° C. | 180 | 180 | 180 |

TABLE 5-continued

| | | Example 9 | Example 6 | Example 10 |
|---|---|---|---|---|
| Moldability (void fraction) | % | 0.07 | 0.07 | 0.07 |

TABLE 6

| | | | Comparative example 4 | Example 11 | Example 12 |
|---|---|---|---|---|---|
| Prepreg | | — | Production example 6 | Production example 6 | Production example 6 |
| Molding pressure | | MPa | 0.3 | 0.3 | 0.3 |
| First heating step | T1 | ° C. | None | 90 | 90 |
| | Time | min | 0 | 60 | 60 |
| Second heating step | T2 | ° C. | None | None | 140 |
| | Time | min | 0 | 0 | 60 |
| Curing step | T3 | ° C. | 180 | 180 | 180 |
| Moldability (void fraction) | | % | 7 | 2 | 0.06 |
| Physical property (ILSS drop rate) | | % | 35 | 20 | 0.3 |

What is claimed is:

1. A method for producing a composite material including a step of curing a prepreg comprising a fiber reinforcement material and a resin composition containing a bismaleimide resin in an uncured state, the method comprising:

a first heating step in which the prepreg is heated to a first temperature ($T_1$) that is lower than a temperature at which the resin composition exhibits a minimum viscosity and held within a range of the first temperature ($T_1$)±10° C. for 30 minutes or more to impregnate the resin composition in an uncured state into a fiber reinforcement material; and a curing step in which the prepreg heated to a third temperature ($T_3$) that is the curing temperature of the resin composition and held at the third temperature ($T_3$) to cure the resin composition, wherein the resin composition includes, as an essential component, an aromatic bismaleimide compound, wherein the content of the aromatic bismaleimide compound in the resin composition is from 30 to 65 weight %; and an alkenyl phenol compound and/or an alkenyl phenol ether compound, wherein the content of the alkenyl phenol compound and/or the alkenyl phenol ether compound in the resin composition is from 20 to 50 weight %, wherein the first temperature ($T_1$) is 80 to 110° C., the third temperature ($T_3$) is 160 to 205° C., and the first temperature ($T_1$) satisfies the following formula (1):

$$Tb \leq T_1 \leq Ta \quad (1)$$

where

Ta is a temperature at which the resin composition exhibits a minimum viscosity and Tb is a temperature at which the resin composition exhibits the viscosity of 100 [Pa·s].

2. The method for producing a composite material according to claim 1, further including a second heating step of holding the prepreg at a second temperature ($T_2$) before the curing of the bismaleimide-based resin composition for 30 minutes or more under a vacuum for removing a volatile content between the first heating step and the curing step, wherein the second temperature ($T_2$) satisfies the following formula (2):

$$T_2 = Tc \pm 20[° C.] \quad (2)$$

where Tc is a peak temperature showing a maximum peak among the peaks observed in a range from 90 to 180 [° C.] in a total ion current chromatogram (TIC) of the prepreg measured at a temperature rising rate of 10 [° C./min] using a thermal gravimetric mass spectrometry apparatus (TG-MS).

3. The method for producing a composite material according to claim 2, having a setting of the first temperature ($T_1$)<the second temperature ($T_2$)<the third temperature ($T_3$).

4. The method for producing a composite material according to claim 1, wherein a pressure during molding is set to 0.5 [MPa] or less.

5. The method for producing a composite material according to claim 1, wherein the fiber reinforcement material is a carbon fiber.

* * * * *